United States Patent
Lee et al.

(10) Patent No.: US 12,210,978 B2
(45) Date of Patent: Jan. 28, 2025

(54) POINT AUTOENCODER, DUAL AUTOENCODER, AND DIMENSIONAL TRANSFORMATION METHOD OF POINT CLOUD USING SAME

(71) Applicant: Research & Business Foundation SUNGKYUNKWAN UNIVERSITY, Suwon-si (KR)

(72) Inventors: Suk Han Lee, Yongin-si (KR); Wencan Cheng, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 939 days.

(21) Appl. No.: 17/308,242

(22) Filed: May 5, 2021

(65) Prior Publication Data
US 2021/0350245 A1 Nov. 11, 2021

(30) Foreign Application Priority Data
May 11, 2020 (KR) .......................... 10-2020-0055909

(51) Int. Cl.
| | |
|---|---|
| *G06N 3/088* | (2023.01) |
| *G06N 3/045* | (2023.01) |
| *G06T 9/00* | (2006.01) |
| *G06T 17/00* | (2006.01) |

(52) U.S. Cl.
CPC ............ *G06N 3/088* (2013.01); *G06N 3/045* (2023.01); *G06T 9/002* (2013.01); *G06T 17/00* (2013.01)

(58) Field of Classification Search
None
See application file for complete search history.

(56) References Cited

U.S. PATENT DOCUMENTS

| | | | |
|---|---|---|---|
| 2015/0062295 A1* | 3/2015 | Yoneda | H04N 21/43635 348/43 |
| 2021/0004645 A1* | 1/2021 | Chaudhuri | G06F 17/16 |
| 2021/0090302 A1* | 3/2021 | Srivastava | G06N 3/045 |

OTHER PUBLICATIONS

Elbaz et al. (Elbaz) "3D Point Cloud Registration for Localization using a Deep Neural Network Auto-Encoder" Proceedings of the IEEE Conference on Computer Vision and Pattern Recognition (CVPR), 2017, pp. 4631-4640 (Year: 2017).*

* cited by examiner

*Primary Examiner* — Xuyang Xia
(74) *Attorney, Agent, or Firm* — NSIP Law

(57) ABSTRACT

The present disclosure provides a point autoencoder including an encoder receiving a 3D point cloud and extracting a global feature and a decoder reconstructing the 3D point cloud from the global feature; a dual autoencoder including the point autoencoder; and a method for dimensional transformation of a point cloud using the dual autoencoder. According to the present disclosure, it is possible to extract features from an input point cloud using a Bias-Induced Decoding (BID) layer, perform reconstruction of a 3D point cloud from the corresponding feature information, and reconstruct a 3D point cloud by using only high-dimensional global features as an input. Also, the present disclosure reduces the amount of storage space used and reduces computational complexity than the conventional structure employing a fully connected layer.

12 Claims, 4 Drawing Sheets

POINT AUTOENCODER, DUAL AUTOENCODER, AND DIMENSIONAL TRANSFORMATION METHOD OF POINT CLOUD USING SAME

CROSS-REFERENCE TO RELATED APPLICATION

This application claims priority to Korean Patent Application No. 10-2020-0055909, filed on May 11, 2020. The entire contents of the application on which the priority is based are incorporated herein by reference.

TECHNICAL FIELD

The present disclosure relates to an autoencoder and a method for dimensional transformation of a point cloud using the autoencoder.

BACKGROUND

Three-dimensional (3D) point cloud representation for 3D object recognition has been used as a powerful tool in fields such as autonomous navigation, machine vision, and virtual reality; and various methods have been proposed to develop the representation. However, since a typical Convolutional Neural Network (CNN) requires input data ordered and related to adjacent elements, processing of a 3D point cloud with irregular characteristics is a very difficult task.

To solve the problem above, a voxelization technique suitable for the structure of a CNN has been proposed; the voxelization, however, sacrifices details of a point cloud and increases the number of unnecessary, redundant voxels that increase computational complexity and decrease representational accuracy.

Meanwhile, PointNet has a lightweight and efficient system structure and is characterized by its capability of handling an irregular point cloud without pre-processing. The PointNet exhibits the best performance among conventional methods and is capable of solving the problem above.

However, a max-pooling operation generating global features in a symmetrical structure retains only a part of semantic information and discards a large amount of structural information. Thus, this characteristic acts as a drawback to reconstruction (disadvantage when restoring) based on unsupervised learning, making it more challenging to restore a three-dimensional structure using global features.

Conventional reconstruction methods based on unsupervised learning use a fully connected layer after acquiring global features and store structural information lost during previous learning stages through a massive structure. However, these methods have a problem that enormous storage space and a large amount of computational operations are required.

SUMMARY

To solve the problem above, the present disclosure provides an autoencoder capable of extracting features from an input point cloud, reconstructing a 3D point cloud from the corresponding feature information, and reconstructing a 3D point cloud using an input consisting only of high-dimensional global features; and a method for dimensional transformation of a point cloud using the autoencoder.

Also, the present disclosure provides an autoencoder capable of reconstructing a 3D point cloud, reducing the amount of storage space used, and reducing computational complexity compared to the structure employing a conventional fully connected layer; and a 2D-to-3D point cloud transformation method using the autoencoder.

In accordance with an aspect of the present disclosure, there is provided a bias-induced point autoencoder. The bias-induced point autoencoder comprises, an encoder configured to receive a 3D point cloud and extract global features; and a decoder configured to reconstruct the 3D point cloud from the global features, wherein the decoder includes a plurality of mapping layers using the global features as an input, and each column of the plurality of mapping layers shares the same weight and has an independent bias.

In accordance with another aspect of the present disclosure, there is provided a dual autoencoder. The dual autoencoder comprises, a 2D encoder configured to extract a first semantic vector from a 2D image; a 2D decoder configured to reconstruct the 2D image from the first semantic vector; a 3D encoder configured to extract a second semantic vector from a 3D point cloud and; a 3D decoder configured to reconstruct the 3D point cloud from the second semantic vector.

In accordance with the other aspect of the present disclosure, there is provided a 2D-to-3D point cloud dimensional transformation method. The method comprises, extracting a latent vector from a 2D image by a 2D encoder; transforming the latent vector to a global feature of a 3D point cloud by an associated network; and reconstructing the 3D point cloud from the global feature by a 3D decoder.

According to a point autoencoder according to embodiments of the present disclosure and a method for dimensional transformation of a point cloud using the point autoencoder, it is possible to extract features from an input point cloud using a Bias-Induced Decoding (BID) layer, reconstruct a 3D point cloud from the corresponding feature information, and reconstruct a 3D point cloud using only high-dimensional global features. Also, according to the present disclosure, it is possible to reduce the amount of storage space used and reduce computational complexity compared to the structure employing a conventional fully connected layer.

DETAILED DESCRIPTION

Figure 1:
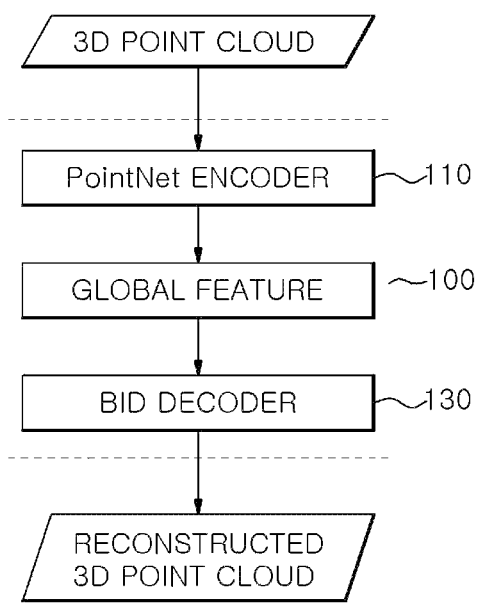
FIG. 1 illustrates a structure of a point autoencoder according to one embodiment of the present disclosure.

Since the present disclosure may be modified in various ways and may provide various embodiments, specific embodiments will be depicted in the appended drawings and described in detail with reference to the drawings.

However, it should be understood that the specific embodiments are not intended to limit the gist of the present disclosure; rather, it should be understood that the specific embodiments include all of the modifications, equivalents, or substitutes belonging to the technical principles and scope of the present disclosure.

Terms such as "first" and "second" may be used to describe various constituting elements, but the constituting elements should not be limited by the terms. The terms are introduced to distinguish one element from the others. For example, without departing from the technical scope of the present disclosure, a first element may be referred to as a second element, and similarly, the second element may be referred to as the first element.

If an element is said to be "connected" or "attached" to a different element, it should be understood that the former may be connected or attached directly to the different element, but another element may be present between the two elements. On the other hand, if an element is said to be "directly connected" or "directly attached" to a different element, it should be understood that there is no other element between the two elements.

Terms used in the present disclosure are intended only for describing a specific embodiment and are not intended to limit the technical scope of the present disclosure. A singular expression should be understood to indicate a plural expression unless otherwise explicitly stated. The term "include" or "have" is used to indicate the existence of an embodied feature, number, step, operation, element, component, or a combination thereof; and the term should not be understood to preclude the existence or possibility of adding one or more other features, numbers, steps, operations, elements, components, or a combination thereof.

Unless defined otherwise, all of the terms used in the present disclosure, including technical or scientific terms, provide the same meaning as understood generally by those skilled in the art to which the present disclosure belongs. Those terms defined in ordinary dictionaries should be interpreted to have the same meaning as conveyed by a related technology in the corresponding context; also, unless otherwise defined explicitly in the present disclosure, those terms should not be interpreted to have ideal or excessively formal meaning.

In what follows, with reference to appended drawings, preferred embodiments of the present disclosure will be described clearly and in detail so that those skilled in the art to which the present disclosure belongs may implement the present disclosure easily.

An autoencoder is an unsupervised learning algorithm mostly used for dimension reduction and pre-training of the network. In particular, during unsupervised learning of a 2D image, an autoencoder extracts valid features from the image and filters irrelevant information so that a decoder may reconstruct the extracted features. Autoencoders based on 3D objects showed excellent performance in various fields and usually voxelize an input point cloud to obtain a serialized input having a structure similar to that of a 2D autoencoder.

However, voxelization sacrifices details of a point cloud and increases the number of unnecessary, redundant voxels that increase computational complexity and decrease accuracy. Moreover, voxelization makes it difficult to retrieve 2D grids preserving the structure of a 3D point cloud, extract global features through a max-pooling function, and reconstruct a 3D structure directly from the extracted global features.

The present disclosure to be described below relates to a point autoencoder for solving the problems above and a 2D-to-3D point cloud transformation method using the autoencoder.

FIG. 1 illustrates a structure of a point autoencoder according to one embodiment of the present disclosure.

Referring to FIG. 1, a point autoencoder 100 according to one embodiment of the present disclosure includes a PointNet encoder 110 and a BID decoder 130.

The PointNet encoder 110 receives a 3D point cloud input and extracts global features. The PointNet encoder 110 may have the same architecture as a PointNet or any other point encoders such as KC-Net encoder. Here, the input may be 3D data obtained through a 3D imaging device such as a LiDAR or a stereo camera.

The PointNet encoder 110 extracts local features of each point through a convolution kernel having shared weights and outputs global features with respect to the whole point cloud through a symmetric max-pooling function.

For example, the PointNet encoder 110 uses a 1×k (where k is the dimensional size of a current point) convolution filter set with a stride of 1×1 to map each point to a high-dimensional space through the same mapping function, where the mapping result is not affected by the order of points in a point cloud. A convolution layer extracts global features of a point cloud using a symmetric max-pooling operator. If an input point cloud includes a point set S, a global feature vector may be determined by Eq. 1.

$$\theta = \mathrm{MAX}_{x_i \in S}\{h(x_i)\} \qquad \text{[Eq. 1]}$$

In Eq. 1, h represents a symmetric mapping function composed of a series of convolution operations, and MAX represents a vector max-pooling function that receives n vectors of the same length and generates a new vector by calculating element-wise maximum values.

Figure 2:
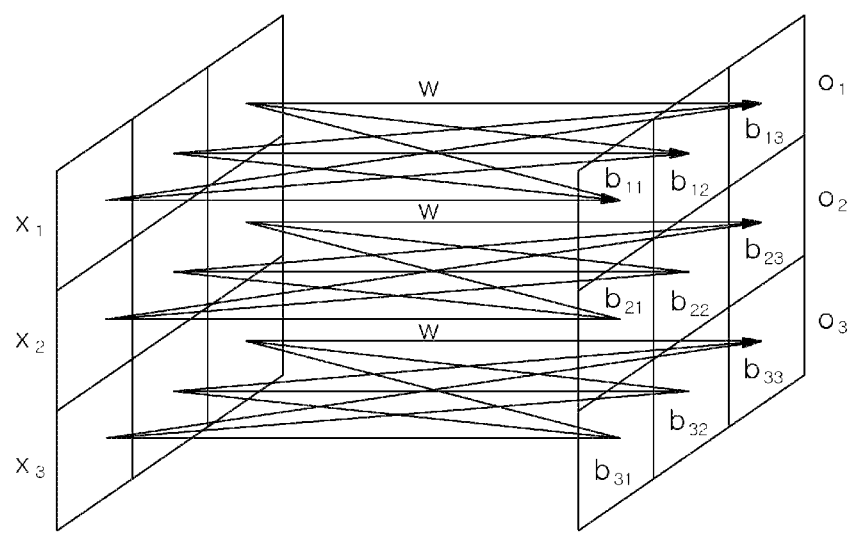
FIG. 2 illustrates a structure of a BID layer according to one embodiment of the present disclosure.

FIG. 2 illustrates a structure of a Bias-Induced Decoding (BID) layer according to one embodiment of the present disclosure.

Referring to FIG. 2, a Bias-Induced decoder (BID) 130 reconstructs a 3D point cloud using global features. The BID decoder 130 comprises a mapping layer having a shared weight and an independent bias. Here, the mapping layer may be a BID layer. The BID layer will be described with reference to FIG. 2.

Referring to FIG. 2, the BID layer is similar to a fully connected layer; however, it differs from the fully connected layer in that each column shares the same weight (w) and has an independent bias (b). Therefore, if the output of the j-th column is denoted by $o_j$, $o_j$ is determined according to Eq. 2.

$$o_j = f(wx_j + b_j) \qquad \text{[Eq. 2]}$$

Referring to Eq. 2, even if the same input is applied to each column (namely, if it is assumed that each row vector is a copy of a global feature), the same value may be easily mapped to a different position due to the existence of various biases. Also, since an output dimension may be adjusted for all of the layers, the same value may be mapped to a different dimensional space. At this time, interaction between x and b determines which bias is activated and sent to a subsequent processing layer. Basically, in the BID structure, features of different dimensional spaces may be regarded as being stored in the biases. When different global features are input, the different features are activated, and a combination of activated features determines a final result.

Although the BID structure may not have a powerful learning capability when it consists of a single layer structure, the BID structure may still provide performance similar to that of a fully connected layer through overlapping of multiple layers. In the BID structure, when the number of input vectors is N, the number of parameters becomes 1/N of the number of parameters for a fully connected layer.

First, the BID decoder 130 obtains the same number of samples as the number of points of a reconstructed point cloud before the mapping operation. If n represents the size of a point cloud and k represents the length of a feature vector, the BID decoder 130 performs a copy operation, copies a global feature n times, obtains n high-dimensional samples, and forms an n×k matrix. Here, since a global feature is extracted from an input point cloud, the global feature includes information on the original input point cloud. However, since each row of the matrix has the same value, if a subsequent task is symmetric, the original 3D structure may not be restored since each row is mapped to the same point. Therefore, through overlapping of a plurality of BID layers, one-to-many mapping may be performed. At this time, a 3D output of the last layer corresponds to a point cloud reconstructed by the BID decoder 130.

When the order of points in an input point cloud is changed, global features are maintained in a consistent manner since the encoder is symmetric. Since biases are fixed after learning is completed, a mapping function of each point is also fixed. Also, a point mapped from each row of a duplicated matrix to 3D space has to maintain consistency. Therefore, global features determine a final point cloud output.

Figure 3:
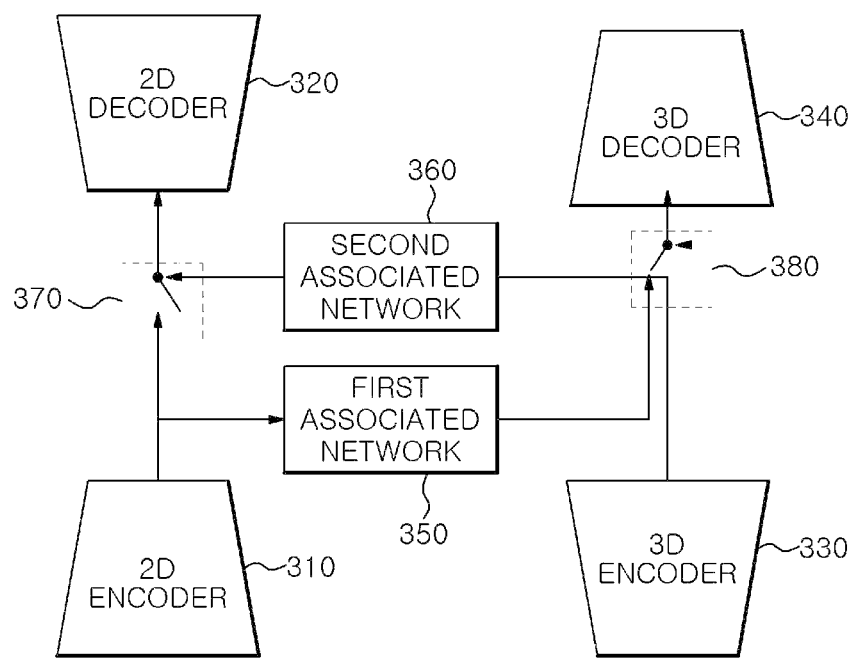
FIG. 3 illustrates a structure of a dual autoencoder performing a method for dimensional transformation of a point cloud according to another embodiment of the present disclosure.

FIG. 3 illustrates a structure of a dual autoencoder performing a method for dimensional transformation of a point cloud according to another embodiment of the present disclosure.

Referring to FIG. 3, a dual autoencoder includes a 2D encoder 310, a 2D decoder 320, a 3D encoder 330, a 3D decoder 340, a first associated network 350, a second associated network 360, a first switch 370, and a second switch 380.

The 2D encoder 310 extracts a high-dimensional semantic vector from a 2D image. The 2D encoder 310 may be constructed to have a structure in which a convolution layer and a fully connected layer are stacked together. An input to the 2D encoder 310 is a 2D image obtained by projecting a 3D point cloud onto a 2D plane at a predetermined angle, and an output of the 3D encoder 310 is a high-dimensional semantic vector for the 2D image.

The 2D decoder 320 is a 2D image decoder, the structure of which is constructed in the opposite of the 2D encoder 310. In other words, the 2D decoder 320 is composed of a fully connected layer and a deconvolution layer and may reconstruct a 2D image from a high-dimensional semantic vector.

The 3D encoder 330 extracts a high-dimensional semantic vector from a 3D point cloud. The 3D encoder 330 may be a PointNet encoder 110.

The 3D decoder 340 reconstructs a 3D point cloud from a high-dimensional semantic vector. The 3D decoder 340 may be a BID decoder 130.

The first associated network 350 transforms a 2D latent vector to a 3D global feature, and the second associated network 360 transforms a 3D global feature to a 2D latent vector. The first associated network 350 and the second associated network 360 may be constructed using fully connected layers.

The first switch 370 determines an input to the 2D decoder 320. In other words, the first switch determines so that the 2D decoder 320 may obtain an input from the 2D encoder 320 or from the second associated network 360.

The second switch 380 determines an input to the 3D decoder 340. In other words, the second switch determines so that the 3D decoder 340 may obtain an input from the 3D encoder 330 or from the first associated network 360.

For example, if the first switch 370 selects the 2D encoder 310 as an input, the left part of FIG. 3 may become an ordinary autoencoder while, if the second associated network 360 is selected as an input, 3D-to-2D point cloud transformation may be performed. Also, if the second switch 380 selects the 3D encoder 330 as an input, the right part of FIG. 3 may become the point autoencoder 100 of FIG. 1 while, if the first associated network 350 is selected as an input, 2D-to-3D point cloud transformation may be performed.

Figure 4:
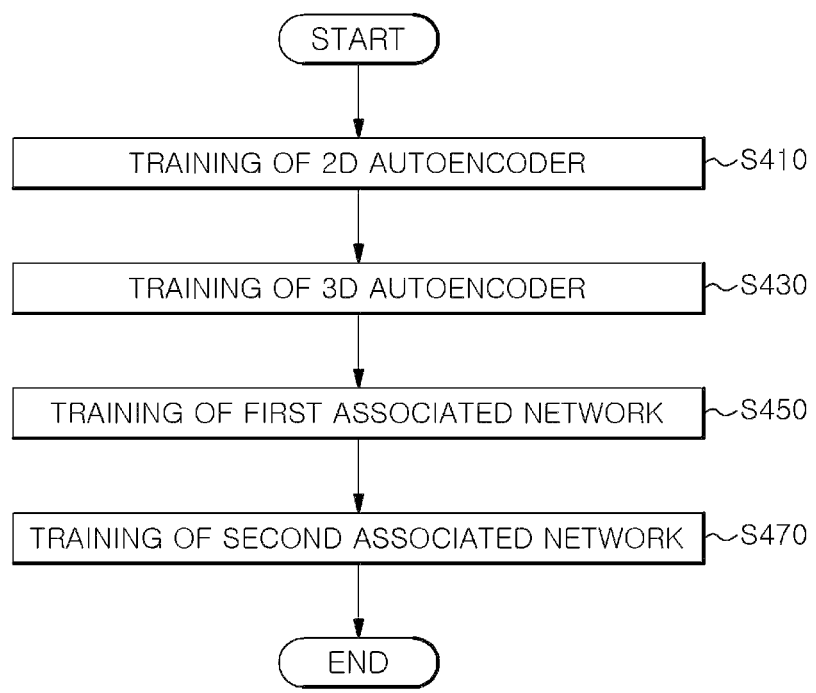
FIG. 4 is a flow diagram illustrating a learning process of the dual autoencoder of FIG. 3.

FIG. 4 is a flow diagram illustrating a learning process of the dual autoencoder of FIG. 3.

Referring to FIG. 4, the S410 step trains a 2D autoencoder. At this time, an input to the 2D autoencoder is a 2D image obtained by projecting a 3D point cloud onto a 2D plane at a predetermined angle, and the mean square error (MSE) between an input image and a reconstructed image may be used as a loss function.

The S430 step trains a 3D autoencoder. An input to the 3D autoencoder is a 3D point cloud, and the chamfer distance between an input point and a reconstructed point may be used as a loss function.

Since an output point cloud is related to sequential biases while an input point cloud is not aligned, the element-wise distance between an input matrix and an output matrix may not be simply used to measure the difference between an output point cloud and an input point cloud. Since the chamfer distance measures a distance between each point and its nearest target point and is independent of the order of points in a point cloud, the chamfer distance is suitable for a loss function in a 3D point cloud. If an input point cloud is denoted by a point set S and a reconstructed output point cloud is denoted by a point set $S_o$, the chamfer distance may be calculated by Eq. 3

$$L_{CH} = \frac{1}{|S|}\sum_{x \in S} \text{MIN}_{o \in S_o} \|x - o\|_2 + \frac{1}{|S_o|}\sum_{x \in S_o} \text{MIN}_{o \in S} \|o - x\|_2 \qquad [\text{Eq. 3}]$$

The S450 step trains the first associated network 350. The goal of the present step is to fit the output of the first associated network 350 to a global feature vector extracted by the 3D autoencoder as much as possible. To this end, first, a 2D image and a 3D point cloud are input respectively to the 2D encoder 310 and the 3D encoder 330 to obtain a latent vector and a global feature. The latent vector is used as an input to the first associated network 350 to calculate a global feature based on the latent vector. Afterward, learning is performed to minimize the MSE between the latent vector-based global feature and a global feature extracted by the 3D autoencoder, where, at this time, ADAM optimizer may be used.

The S470 step trains the second associated network 360. The present step is similar to the S450 step except that a global feature is used as an input to the second associated network 360. Learning is performed to minimize the MSE between an input to the second associated network 360 and a latent vector.

The point autoencoder according to the present disclosure and a method for dimensional transformation of a point cloud using the autoencoder may be implemented in the form of computer-readable code in a computer-readable recording medium. A computer-readable recording medium includes all kinds of recording devices storing data that may be interpreted by a computer system. Examples of computer-readable recording media include a Read Only Memory (ROM), a Random Access Memory (RAM), a magnetic tape, a magnetic disk, a flash memory, and an optical data storage device. Also, a computer-readable recording medium may be distributed over computer systems connected to each other through a computer communication network to store and execute computer-readable code in a distributed manner.

Also, an encoder of the point autoencoder and a decoder including a mapping layer may be implemented by a computer-readable recording medium, for example, a memory, which stores a computer program consisting of instructions that executes at least one processor and a method for dimensional transformation of a point cloud.

Also, a 2D encoder, a 2D decoder, a 3D encoder, and a 3D decoder of a dual autoencoder may be implemented by a computer-readable recording medium, for example, a memory, which stores a computer program consisting of instructions that executes at least one processor and a method for dimensional transformation of a point cloud.

So far, the present disclosure has been described with reference to appended drawings and embodiments, but the technical scope of the present disclosure is not limited to the drawings or embodiments. Rather, it should be understood by those skilled in the art to which the present disclosure belongs that the present disclosure may be modified or changed in various ways without departing from the technical principles and scope of the present disclosure defined by the appended claims below.

What is claimed is:

1. A bias-induced point autoencoder comprising:
an encoder configured to receive a 3D point cloud and extract global features; and
a decoder configured to reconstruct the 3D point cloud from the global features,
wherein the decoder includes a plurality of mapping layers using the global features as an input, and
each column of the plurality of mapping layers shares the same weight and has an independent bias,
wherein each of the plurality of mapping layers layer is a Bias-Induced Decoding (BID) layer,
wherein the bias-induced point autoencoder is trained by using the 3D point cloud as an input and a chamfer distance determined by $$L_{CH} = \frac{1}{|S|} \sum_{x \in S} \text{MIN}_{o \in S_o} \|x - o\|_2 + \frac{1}{|S_o|} \sum_{x \in S_o} \text{MIN}_{o \in S} \|o - x\|_2$$

as a loss function, where S represents a point set of an input point cloud, and $S_o$ represents a point set of an output point cloud, x represents each input vector of the plurality of mapping layers, and o represents each output of the plurality of mapping layers.

2. A dual autoencoder comprising:
a 2D encoder configured to extract a first semantic vector from a 2D image;
a 2D decoder configured to reconstruct the 2D image from the first semantic vector;
a 3D encoder configured to extract a second semantic vector from a 3D point cloud; and
a 3D decoder configured to reconstruct the 3D point cloud from the second semantic vector, wherein the 3D decoder includes a plurality of mapping layers, and each column of the plurality of mapping layers shares the same weight and has an independent bias,
wherein each of the plurality of mapping layers is a BID layer,
wherein the dual autoencoder is trained by using the 3D point cloud as an input and a chamfer distance determined by $$L_{CH} = \frac{1}{|S|} \sum_{x \in S} \text{MIN}_{o \in S_o} \|x - o\|_2 + \frac{1}{|S_o|} \sum_{x \in S_o} \text{MIN}_{o \in S} \|o - x\|_2$$

as a loss function, where S represents a point set of an input point cloud, and $S_o$ represents a point set of an output point cloud, x represents each input vector of the plurality of mapping layers, and o represents each output of the plurality of mapping layers.

3. The dual autoencoder of claim 2, wherein the first semantic vector is a latent vector of the 2D image, and the second semantic vector is a global feature of the 3D point cloud.

4. The dual autoencoder of claim 3, wherein the 3D encoder is a PointNet encoder and extracts the global feature through a symmetric max-pooling function.

5. The dual autoencoder of claim 3, further comprising:
a first associated network configured to transform the latent vector to the global feature;
a second associated network configured to transform the global feature to the latent vector;
a first switch configured to determine an input of the 2D decoder; and
a second switch configured to determine an input of the 3D decoder.

6. The dual autoencoder of claim 5, wherein, if the first switch determines the global feature as an input to the 2D decoder, 3D encoder, the second associated network, and the 2D decoder perform 3D-to-2D point cloud transformation.

7. The dual autoencoder of claim 5, wherein, if the second switch determines the latent vector as an input to the 3D decoder, the 2D encoder, the first associated network, and the 3D decoder perform 2D-to-3D point cloud transformation.

8. The dual autoencoder of claim 3, wherein the dual encoder comprises,
training a 2D autoencoder, training a 3D autoencoder,
training the first associated network, and
training the second associated network,
wherein the 2D autoencoder includes the 2D encoder and the 2D decoder and the 3D autoencoder includes the 3D encoder and the 3D decoder.

9. The dual autoencoder of claim 8, wherein training of the first associated network comprises
inputting the 2D image and the 3D point cloud respectively to the 2D encoder and the 3D encoder and obtaining a latent vector and a first global feature;
calculating a second global feature based on the latent vector by using the latent vector as an input to the first associated network; and
training to minimize the mean square error (MSE) between the first global feature and the second global feature.

10. The dual autoencoder of claim 2, wherein the output of each column of the mapping layer is determined by $$o_j = f(wx_j + b_j),$$

where $o_j$ represents an output vector of the j-th column, $x_j$ represents an input vector of the j-th column, w represents the weight shared by the j-th column, and $b_j$ represents a bias of the j-th column.

11. A 2D-to-3D point cloud dimensional transformation method, the method comprising:
- extracting a latent vector from a 2D image by a 2D encoder;
- transforming the latent vector to a global feature of a 3D point cloud by an associated network; and
- reconstructing the 3D point cloud from the global feature by a 3D decoder,
- wherein the 3D decoder includes a plurality of mapping layers, and each column of the plurality of mapping layers shares the same weight and has an independent bias,
- wherein each of the plurality of mapping layers is a BID layer;
- wherein a bias-induced point autoencoder is trained by using the 3D point cloud as an input and a chamfer distance determined by $$L_{CH} = \frac{1}{|S|}\sum_{x \in S}\text{MIN}_{o \in S_o}\|x-o\|_2 + \frac{1}{|S_o|}\sum_{x \in S_o}\text{MIN}_{o \in S}\|o-x\|_2$$

as a loss function, where S represents a point set of an input point cloud, and $S_o$ represents a point set of an output point cloud, x represents each input vector of the plurality of mapping layers, and o represents each output of the plurality of mapping layers.

12. The method of claim 11, wherein the output of each column of the mapping layer is determined by $$o_j = f(wx_j + b_j),$$

where $o_j$ represents an output vector of the j-th column, $x_j$ represents an input vector of the j-th column, w represents the weight shared by the j-th column, and $b_j$ represents a bias of the j-th column.

* * * * *